United States Patent
Whetsell et al.

(10) Patent No.: US 10,572,578 B2
(45) Date of Patent: *Feb. 25, 2020

(54) SYSTEM AND METHOD FOR PROCESSING DOCUMENT

(75) Inventors: Nathan Alexander Whetsell, New York, NY (US); Benjamin Stuart Whetsell, New York, NY (US)

(73) Assignee: Paper Software LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,516

(22) Filed: Jul. 11, 2012

(65) Prior Publication Data

US 2013/0019165 A1    Jan. 17, 2013

Related U.S. Application Data

(60) Provisional application No. 61/506,408, filed on Jul. 11, 2011, provisional application No. 61/534,515, filed on Sep. 14, 2011.

(51) Int. Cl.
*G06F 17/00* (2019.01)
*G06F 17/22* (2006.01)

(52) U.S. Cl.
CPC .............................. *G06F 17/2241* (2013.01)

(58) Field of Classification Search
CPC ............... G06F 17/21; G06F 17/30896; G06F 17/2241; G06F 17/24
USPC .......... 715/200, 255, 234, 249, 270
See application file for complete search history.

(56) References Cited

U.S. PATENT DOCUMENTS

| | | | |
|---|---|---|---|
| 4,996,665 A * | 2/1991 | Nomura | G06F 17/218 |
| 5,644,334 A | 7/1997 | Jones et al. | |
| 5,649,192 A | 7/1997 | Stucky | |
| 5,778,401 A * | 7/1998 | Beer | G06F 17/24 715/210 |
| 5,924,107 A * | 7/1999 | Fukao | G06F 17/24 715/212 |
| 5,940,842 A | 8/1999 | Sakuta | |
| 5,943,669 A * | 8/1999 | Numata | G06F 17/30707 |
| 6,067,531 A | 5/2000 | Hoyt et al. | |
| 6,366,906 B1 | 4/2002 | Hoffman | |
| 6,694,484 B1 | 2/2004 | Mueller | |
| 6,751,620 B2 | 6/2004 | Orbanes | |
| 6,839,701 B1 | 1/2005 | Baer et al. | |
| 6,857,102 B1 * | 2/2005 | Bickmore | G06F 17/2247 707/E17.121 |
| 6,915,299 B1 | 7/2005 | Arcuri et al. | |
| 7,137,072 B2 | 11/2006 | Bauer et al. | |
| 7,231,386 B2 * | 6/2007 | Nonomura et al. | |
| 7,340,674 B2 | 3/2008 | Newman | |

(Continued)

OTHER PUBLICATIONS

Chawathe et al., Change Detection in Hierarchically Structured Information, ACM 1996, pp. 493-504.*

(Continued)

*Primary Examiner* — Cong-Lac Huynh
(74) *Attorney, Agent, or Firm* — Brian J. Colandreo; Jeffrey T. Placker; Holland & Knight LLP

(57) ABSTRACT

A method and computing system are provided for processing a document to associate a plurality of items within the document with a group. A first item included within the group may be modified. All other items in the group may also be modified based on the modified first item.

18 Claims, 10 Drawing Sheets

(56) References Cited

U.S. PATENT DOCUMENTS

| | | | |
|---|---|---|---|
| 7,380,201 B2 | 5/2008 | Vase | |
| 7,418,660 B2 | 8/2008 | Hua et al. | |
| 7,428,699 B1 | 9/2008 | Kane et al. | |
| 7,475,333 B2 | 1/2009 | Otter et al. | |
| 7,475,337 B1 | 1/2009 | Huang | |
| 7,480,708 B2 | 1/2009 | Muehl | |
| 7,496,837 B1 | 2/2009 | Larcheveque et al. | |
| 7,519,579 B2* | 4/2009 | Yalovsky | G06F 17/30719 |
| 7,539,940 B2 | 5/2009 | Yalovsky et al. | |
| 7,562,085 B2 | 7/2009 | Bier et al. | |
| 7,644,360 B2 | 1/2010 | Beretich et al. | |
| 7,657,515 B1 | 2/2010 | Jewell | |
| 7,657,832 B1 | 2/2010 | Lin | |
| 7,676,745 B2 | 3/2010 | Egnor | |
| 7,689,933 B1* | 3/2010 | Parsons | 715/838 |
| 7,865,820 B2 | 1/2011 | Sauer et al. | |
| 7,917,848 B2* | 3/2011 | Harmon | G06F 17/212 358/1.1 |
| 8,095,575 B1* | 1/2012 | Sharma et al. | 707/811 |
| 8,095,882 B2 | 1/2012 | Kashi | |
| 8,108,768 B2 | 1/2012 | Petri | |
| 8,196,030 B1* | 6/2012 | Wang | G06K 9/00442 345/581 |
| 8,209,278 B1 | 6/2012 | Sraus | |
| 8,224,785 B2 | 7/2012 | Myers et al. | |
| 8,380,753 B2* | 2/2013 | Mansfield | G06F 17/2241 707/802 |
| 8,397,155 B1 | 3/2013 | Szabo | |
| 8,423,471 B1 | 4/2013 | Emigh | |
| 8,479,092 B1* | 7/2013 | Pandey | 715/252 |
| 8,745,488 B1 | 6/2014 | Wong | |
| 8,762,411 B2 | 6/2014 | Poon | |
| 8,826,173 B2 | 9/2014 | Bay et al. | |
| 8,886,676 B2* | 11/2014 | Mansfield | G06F 17/2241 707/791 |
| 8,892,591 B1 | 11/2014 | Haugen | |
| 8,983,955 B2 | 3/2015 | Lessing et al. | |
| 8,984,396 B2* | 3/2015 | Tingstrom | G06F 17/227 715/234 |
| 9,001,390 B1* | 4/2015 | Zernik | H04N 1/40 358/448 |
| 9,043,285 B2 | 5/2015 | Bekkerman | |
| 9,122,667 B2 | 9/2015 | Vasey | |
| 9,135,249 B2 | 9/2015 | Dejean | |
| 9,384,172 B2 | 7/2016 | Lukic et al. | |
| 9,400,790 B2 | 7/2016 | Yasrebi et al. | |
| 9,418,054 B2* | 8/2016 | Shaver | G06F 17/24 |
| 9,449,080 B1 | 9/2016 | Zhang | |
| 9,489,119 B1 | 11/2016 | Smith, Jr. | |
| 9,519,872 B2 | 12/2016 | Griggs | |
| 9,558,187 B2* | 1/2017 | Bastide | G06F 17/30011 |
| 9,639,510 B2* | 5/2017 | Isidore | H05K 999/99 |
| 9,719,702 B2 | 8/2017 | Murata et al. | |
| 9,773,119 B2 | 9/2017 | Sinha et al. | |
| 9,792,270 B2* | 10/2017 | Kloiber | G06F 17/24 |
| 2001/0001857 A1* | 5/2001 | Kendall | G06T 11/60 715/205 |
| 2001/0018739 A1 | 8/2001 | Anderson et al. | |
| 2002/0083096 A1 | 6/2002 | Hsu | |
| 2002/0129056 A1* | 9/2002 | Conant et al. | 707/511 |
| 2002/0129066 A1* | 9/2002 | Milward et al. | 707/523 |
| 2002/0184308 A1 | 12/2002 | Levy et al. | |
| 2002/0188627 A1* | 12/2002 | Bleizeffer et al. | 707/500 |
| 2003/0018660 A1* | 1/2003 | Martin et al. | 707/500 |
| 2003/0074345 A1 | 4/2003 | Baldwin et al. | |
| 2003/0140053 A1 | 7/2003 | Vasey | |
| 2003/0196176 A1 | 10/2003 | Abu-Ghazalah et al. | |
| 2003/0200501 A1 | 10/2003 | Friebel | |
| 2003/0220854 A1 | 11/2003 | Chu | |
| 2004/0006742 A1 | 1/2004 | Slocombe | |
| 2004/0015408 A1 | 1/2004 | Rauen, IV et al. | |
| 2004/0064480 A1 | 4/2004 | Bartlett et al. | |
| 2004/0068694 A1 | 4/2004 | Kaler et al. | |
| 2004/0083432 A1 | 4/2004 | Kawamura et al. | |
| 2004/0111675 A1* | 6/2004 | Mori et al. | 715/513 |
| 2004/0205047 A1 | 10/2004 | Carpenter | |
| 2005/0010865 A1 | 1/2005 | Kuppusamy et al. | |
| 2005/0039118 A1 | 2/2005 | Gordon et al. | |
| 2005/0086598 A1* | 4/2005 | Marshall et al. | 715/530 |
| 2005/0102612 A1 | 5/2005 | Allan | |
| 2005/0154971 A1* | 7/2005 | Nagao | G06F 17/2241 715/233 |
| 2005/0160379 A1 | 7/2005 | Roberts | |
| 2005/0187954 A1* | 8/2005 | Raman | G06F 17/30908 |
| 2005/0193330 A1 | 9/2005 | Peters | |
| 2005/0203924 A1 | 9/2005 | Rosenberg | |
| 2005/0210016 A1 | 9/2005 | Brunecky | |
| 2005/0246631 A1* | 11/2005 | Mori et al. | 715/515 |
| 2006/0010377 A1* | 1/2006 | Anecki et al. | 715/530 |
| 2006/0034434 A1 | 2/2006 | Kashi | |
| 2006/0047646 A1 | 3/2006 | Maluf et al. | |
| 2006/0080599 A1* | 4/2006 | Dubinsky | 715/513 |
| 2006/0085765 A1 | 4/2006 | Peterson et al. | |
| 2006/0107200 A1 | 5/2006 | Ching | |
| 2006/0107251 A1 | 5/2006 | Boshier et al. | |
| 2006/0129569 A1 | 6/2006 | Dieberger et al. | |
| 2006/0161781 A1 | 7/2006 | Rice et al. | |
| 2006/0190816 A1 | 8/2006 | Vasey | |
| 2006/0206490 A1 | 9/2006 | Schiller | |
| 2006/0242180 A1 | 10/2006 | Graf et al. | |
| 2006/0242549 A1 | 10/2006 | Schwier et al. | |
| 2006/0271519 A1 | 11/2006 | Blackwood et al. | |
| 2007/0055679 A1 | 3/2007 | Yoshida et al. | |
| 2007/0185837 A1 | 8/2007 | Gurcan et al. | |
| 2007/0185846 A1 | 8/2007 | Budzik et al. | |
| 2007/0198952 A1* | 8/2007 | Pittenger | G06F 17/24 715/853 |
| 2008/0010605 A1 | 1/2008 | Frank | |
| 2008/0065973 A1 | 3/2008 | Schumacher et al. | |
| 2008/0104506 A1* | 5/2008 | Farzindar | G06F 17/30719 715/254 |
| 2008/0114700 A1 | 5/2008 | Moore et al. | |
| 2008/0120376 A1 | 5/2008 | Allsop | |
| 2008/0163159 A1 | 7/2008 | Oara | |
| 2008/0168056 A1 | 7/2008 | Bluvband et al. | |
| 2008/0172616 A1 | 7/2008 | Harrington | |
| 2008/0243786 A1 | 10/2008 | Stading | |
| 2008/0281860 A1 | 11/2008 | Elias et al. | |
| 2009/0083612 A1 | 3/2009 | Baker | |
| 2009/0119574 A1 | 5/2009 | Gitlin et al. | |
| 2009/1038466 | 5/2009 | Henry et al. | |
| 2009/0144277 A1* | 6/2009 | Trutner | G06F 17/2241 |
| 2009/0144294 A1 | 6/2009 | Kemp | |
| 2009/0172773 A1 | 7/2009 | Moore et al. | |
| 2009/0228777 A1 | 9/2009 | Henry et al. | |
| 2009/0249178 A1 | 10/2009 | Ambrosino et al. | |
| 2009/0249181 A1 | 10/2009 | Bloom | |
| 2009/0276378 A1* | 11/2009 | Boguraev | G06F 17/218 706/12 |
| 2009/0281853 A1* | 11/2009 | Misvaer et al. | 705/7 |
| 2009/0313236 A1 | 12/2009 | Hernacki et al. | |
| 2009/0327862 A1* | 12/2009 | Emek | G06F 17/2247 715/234 |
| 2010/0005058 A1 | 1/2010 | Tagg | |
| 2010/0005388 A1* | 1/2010 | Haschart et al. | 715/256 |
| 2010/0041467 A1 | 2/2010 | St John et al. | |
| 2010/0121816 A1 | 2/2010 | Petri | |
| 2010/0095202 A1* | 4/2010 | Ishizuka | 715/255 |
| 2010/0100572 A1 | 4/2010 | Schiller | |
| 2010/0107059 A1 | 4/2010 | Suzumura et al. | |
| 2010/0174978 A1 | 7/2010 | Mansfield et al. | |
| 2010/0191748 A1 | 7/2010 | Martin | G06F 17/30675 707/750 |
| 2010/0192358 A1 | 8/2010 | Lindberg et al. | |
| 2010/0228734 A1 | 9/2010 | Murthy | |
| 2010/0268528 A1* | 10/2010 | Raskina et al. | 704/9 |
| 2010/0281383 A1 | 11/2010 | Meaney | |
| 2010/0306260 A1* | 12/2010 | Dejean | G06F 17/2745 707/776 |
| 2010/0318567 A1 | 12/2010 | Kuo et al. | |
| 2010/0332974 A1* | 12/2010 | Thomas | 715/255 |
| 2011/0173528 A1 | 7/2011 | Zunger | |
| 2011/0231385 A1 | 9/2011 | Wang et al. | |

(56) References Cited

U.S. PATENT DOCUMENTS

| | | | |
|---|---|---|---|
| 2011/0239101 A1* | 9/2011 | Rivers-Moore | H04L 67/2823 715/226 |
| 2011/0258173 A1 | 10/2011 | Ratiner et al. | |
| 2011/0289105 A1 | 11/2011 | Hershowitz | |
| 2012/0011475 A1 | 1/2012 | Hontz, Jr. | |
| 2012/0041955 A1 | 2/2012 | Regev et al. | |
| 2012/0054604 A1* | 3/2012 | Warncke-Wang | 715/255 |
| 2012/0078934 A1 | 3/2012 | Goerke et al. | |
| 2012/0089903 A1 | 4/2012 | Liu et al. | |
| 2012/0095987 A1 | 4/2012 | Cheng | |
| 2012/0143842 A1 | 6/2012 | Lacasse | |
| 2012/0179684 A1 | 7/2012 | Alba et al. | |
| 2012/0233171 A1 | 9/2012 | Richard | |
| 2012/0310663 A1 | 12/2012 | Jackson | |
| 2012/0323919 A1 | 12/2012 | Alba et al. | |
| 2013/0019151 A1 | 1/2013 | Whetsell et al. | |
| 2013/0019164 A1 | 1/2013 | Whetsell et al. | |
| 2013/0019167 A1 | 1/2013 | Whetsell et al. | |
| 2013/0097490 A1 | 4/2013 | Kotler | |
| 2013/0124975 A1 | 5/2013 | Lessing et al. | |
| 2013/0151564 A1 | 6/2013 | Brinkman | |
| 2013/0151974 A1 | 6/2013 | Cho | |
| 2013/0185634 A1 | 7/2013 | Fox et al. | |
| 2013/0198596 A1* | 8/2013 | Angelillo et al. | 715/205 |
| 2013/0205197 A1 | 8/2013 | Wong | |
| 2013/0219483 A1 | 8/2013 | Cho et al. | |
| 2013/0227406 A1 | 8/2013 | Mansfield et al. | |
| 2013/0238316 A1 | 9/2013 | Shastri et al. | |
| 2013/0294694 A1 | 11/2013 | Zhang et al. | |
| 2013/0339846 A1* | 12/2013 | Buscemi | 715/254 |
| 2014/0006490 A1 | 1/2014 | Setlur et al. | |
| 2014/0012787 A1 | 1/2014 | Zhang | |
| 2014/0013209 A1 | 1/2014 | Good | |
| 2014/0068400 A1* | 3/2014 | Gulezian et al. | 715/202 |
| 2014/0082469 A1 | 3/2014 | Sitrick et al. | |
| 2014/0085323 A1* | 3/2014 | Wang | G06K 9/00442 345/581 |
| 2014/0222717 A1 | 8/2014 | Planitzer | |
| 2014/0258832 A1 | 9/2014 | Hepp et al. | |
| 2015/0121335 A1 | 4/2015 | Braun et al. | |
| 2015/0242375 A1 | 8/2015 | Lessing et al. | |
| 2015/0339278 A1* | 11/2015 | Bao | G06F 17/2288 715/229 |
| 2015/0363478 A1* | 12/2015 | Haynes | G06F 17/30575 707/625 |
| 2016/0343404 A1 | 11/2016 | Roenning | |

OTHER PUBLICATIONS

Biagioli et al., The NIR Project Standards and Tools for Legislative Drafting and Legal Document Web Publication, Google 2003, pp. 1-10.*

Schweighofer et al., Automatic Text Representation, Classification and Labeling in European Law, ACM 2001, pp. 78-87.*

Saravanan et al., Improving Legal Information Retrieval Using an Ontological Framework, Springer 2009, pp. 101-124.*

Kummamuru et al., A Hierarchical Monothetic Document Clustering Algorithm for Summarization and Browsing Search Results, ACM 2004, pp. 658-665.*

Noll et al., Exploring Social Annotations for Web Document Classification, ACM 2008, pp. 2315-2320.*

Wu et al., Table of Contents Recognition and Extraction for Heterogeneous Book Documents, IEEE 2013, pp. 1205-1209.*

Biagioli et al., Automatic Semantics Extraction in Law Documents, ACM 2005, pp. 133-140.*

Dejean, Numbered Sequence Detection in Documents, Google Scholar 2010, pp. 1-12.*

Gopal et al., Integrating Content-based Access Mechanisms with Hierarchical File Systems, Usenix 1999, pp. 1-15.*

International Search Report and Written Opinion, dated Sep. 24, 2012, received in counterpart International Application No. PCT/US2012/046264, 9 pgs.

International Search Report and Written Opinion, dated Sep. 20, 2012, received in counterpart International Application No. PCT/US2012/046289, 7 pgs.

International Search Report and Written Opinion, dated Sep. 21, 2012, received in counterpart International Application No. PCT/US2012/046297, 6 pgs.

International Search Report and Written Opinion, dated Sep. 21, 2012, received in counterpart International Application No. PCT/US2012/046277, 6 pgs.

International Preliminary Report on Patentability for International Application No. PCT/US2012/046264 dated Jan. 23, 2014. 7 pages.

International Preliminary Report on Patentability for International Application No. PCT/US2012/046289 dated Jan. 23, 2014. 6 pages.

International Preliminary Report on Patentability for International Application No. PCT/US2012/046297 dated Jan. 23, 2014. 5 pages.

International Preliminary Report on Patentability for International Application No. PCT/US2012/046277 dated Jan. 23, 2014. 5 pages.

Navarro et al. Proximal Nodes: A Model to Query Document Database by Content and Structure, ACM 1997, 400-435.

Wang et al., Discovering Typical Structures of Documents: A Road Map Approach, ACM 1998, pp. 146-154.

Sarkar, et al., On the Reading of Tables of Contents, IEEE 2008, pp. 386-393.

Sanderson, et al. Deriving Concept Hierarchies from Text, ACM 1999, pp. 206-213.

Cai, et al., Hierarchical Document Categorization with Suport Vector Machinesm, ACM 2004, pp. 78-87.

Non-Final Office Action issued in counterpart U.S. Appl. No. 13/546,469 dated Oct. 19, 2015.

Non-Final Office Action issued in related U.S. Appl. No. 13/546,578 dated Sep. 11, 2015.

Non-Final Office Action issued in related U.S. Appl. No. 13/546,578 dated Oct. 23, 2014.

Final Office Action issued in related U.S. Appl. No. 13/546,578 dated Feb. 27, 2015.

Non-Final Office Action issued in related U.S. Appl. No. 13/546,469 dated Oct. 24, 2014.

Final Office Action issued in related U.S. Appl. No. 13/546,469 dated May 6, 2015.

Non-Final Office Action issued in related U.S. Appl. No. 13/546,413 dated Dec. 4, 2015.

Final Office Action issued in related U.S. Appl. No. 13/546,413 dated Apr. 7, 2015.

Non-Final Office Action issued in related U.S. Appl. No. 13/546,413 dated Sep. 25, 2015.

Extended Search Report issued in related European Patent Application No. 12 810 545.9 dated Sep. 8, 2015.

Extended Search Report issued in related European Patent Application No. 12 810 920.4 dated Sep. 16, 2015.

Extended Search Report issued in related European Patent Application No. 12 81 0666.3 dated Sep. 16, 2015.

Katherine Murray, et al.,: "Microsoft Office Word 2007 Inside Out; Chapter 14" In: "Microsoft Office Word 2007 Inside Out; Chapter 14", Jan. 1, 2007 (Jan. 1, 2007), Microsoft Press, XP055212784, ISBN: 978-0-73-562330-9 pp. 382-401, the whole document* p. 384-p. 385* p. 391-p. 393* pp. 395, 398.

Anonymous: "How to automatically add paragraph numbering to Existing text in word or wordperfect?—AnandTech Forums", Nov. 19, 2002 (Nov. 19, 2002), XP055212761, Retrieved from the Internet: URL:http://forums.anandtech.com/showthread.php?t=927457 [retrieved on Sep. 11, 2015] *the whole document*.

Anonymouns: "Outline numbering (Word's Numbering Explained)", Jun. 29, 2011 (Jun. 29, 2011), XP055212757, Retrieved from the Internet: URL:http://web.archive.org/web/20110629211911/http://word.mvps.org/faqs/numbering/NumberingExplained/TypesOfNumbering/OutlineNumbering.htm [retrieived on Sep. 11, 2015] *the whole document*.

Extended Search Report issued in related European Patent Application No. 12 811 496.4 dated Sep. 16, 2015.

Anonymous: "Using QuickBullets (QuickNumbers) in WordPerfect < CompuSavvy's Word & WordPerfect Tips", Jan. 30, 2011 (Jan. 30, 2011), XP05521310, Retrieved from the Internet: URL:http://web.archive.org/web/20110130083808/http://compusavvy.wordpress.

(56) References Cited

OTHER PUBLICATIONS com/2010/06/20/using-quickbullets-quicknumbers-in-wordperfect/ [retrieved on Sep. 14, 2015] *the whole document *.
Patent Examination Report dated Aug. 8, 2016 in counterpart Australian Patent Application No. 2012281166.
Patent Examination Report dated Aug. 15, 2016 in counterpart Australian Patent Application No. 2012281151.
Moens, et al, Abstracting of Legal Cases: The Salomon Experience, ACM 1991, pp. 114-122.
Agosit, et al, A Two-level Hypertext Retrieval Model for Legal Data, ACM 1991, pp. 316-325.
Final Office Action issued in related U.S. Appl. No. 13/546,469 dated May 11, 2016.
Final Office Action issued in related U.S. Appl. No. 13/546,578 dated Jun. 17, 2016.
Non-Final Office Action issued in related U.S. Appl. No. 13/546,469 dated Nov. 18, 2016.
Day et al., Mixed-Initiative Development of Language Processing System, ACM 1997, pp. 345-355.
Yang et al., Interoperation Support for Electronic Business, ACM 2000, pp. 39-47.
Patent Examination Report dated Sep. 15, 2016 in counterpart Australian Patent Application No. 2012281160.
Patent Examination Report dated Aug. 1, 2016 in counterpart Australian Patent Application No. 2012282688.
Non-Final Office Action issued in related U.S. Appl. No. 13/546,413 dated Apr. 7, 2017.
Final Office Action issued in counterpart U.S. Appl. No. 13/546,469 dated May 17, 2017.
Non-Final Office Action issued in counterpart U.S. Appl. No. 13/546,578 dated May 5, 2017.
Patent Examination Report dated Jul. 6, 2017 in counterpart Australian Patent Application No. 2012281151.
Patent Examination Report No. 2 dated Jul. 25, 2017 in counterpart Australian Patent Application No. 2012281160.
Patent Examination Report No. 2 dated Jul. 18, 2017 in counterpart Australian Patent Application No. 2012282688.
Patent Examination Report No. 2 dated Jul. 27, 2017 in counterpart Australian Patent Application No. 2012281166.
Non-Final Office Action dated Sep. 25, 2017 in counterpart U.S. Appl. No. 13/546,469 dated Sep. 25, 2017.
Final Office Action issued in counterpart U.S. Appl. No. 13/546,413 dated Nov. 2, 2017.
Romero, et al., Applying Web Usage Mining for Personalizing Hyperlinks in Web-based Adaptive Educational Systemsa, Elsevier 2009, pp. 828-840.
Final Office Action dated Dec. 18, 2017 in counterpart U.S. Appl. No. 13/546,578.
Examiner's Report issued in counterpart Canadian Patent Application No. 2,840,228 dated May 31, 2018.
Examiner's Report issued in counterpart Canadian Patent Application No. 2,840,233 dated Jun. 1, 2018.
Non-Final Office Action issued in U.S. Appl. No. 13/546,413 dated Jul. 2, 2018.
Final Office Action issued in U.S. Appl. No. 13/546,469 dated Jul. 11, 2018.
Non-Final Office Action issued in U.S. Appl. No. 13/546,578 dated Jul. 26, 2018.
Examiner's Report issued in Canadian Application 2,840,231 dated May 31, 2018.
Examiner's Report issued in Canadian Application 2,840,229 dated May 31, 2018.
Final Office Action issued in U.S. Appl. No. 13/546,413 dated Apr. 12, 2019.
Final Office Action issued in U.S. Appl. No. 13/546,578 dated May 3, 2019.
Nation et al., Visualizing Websites Using a Hierarchical Table of Contents Browser: WebTOC, ScienceDirect 2003, pp. 199-210. (Year: 2003).
Examiner's Report dated May 22, 2019 in counterpart Canadian Patent Application No. 2,840,233.
Notice of Allowance issued in U.S. Appl. No. 13/546,469 dated Jun. 7, 2019.
Notice of Allowance issued in U.S. Appl. No. 13/546,413 dated Jul. 11, 2019.
Schweighofer et al., Legal Expert System KONTERM—Automatic Representation of Document Structure and Contents, Srpinger 2005, pp. 1-12, 2005.
Canada Examination Report issued in CA App. No. 2,840,228 dated May 23, 2019.
Canada Examination Report issued in CA App. No. 2,840,231 dated May 23, 2019.
Canada Examination Report issued in CA App. No. 2,840,229 dated May 30, 2019.
Notice of Allowance dated Nov. 4, 2019 in U.S. Appl. No. 13/546,578.

* cited by examiner

350

1. Lorem Ipsum
   1.1 Dolor Sit Amet
   1.2 Consectetur Adipisicing Elit
   1.3 Sed Do Eiusmod
   1.4 Tempor Incididunt Ut
   1.5 Labore Et Dolore Magna Aliqua 2. Lorem Ipsum
   2.1 Dolor Sit Amet
   2.2 Consectetur Adipisicing Elit — 274
   2.3 Sed Do Eiusmod
   2.4 Tempor Incididunt Ut
   2.5 Labore Et Dolore Magna Aliqua 3. Lorem Ipsum
   3.1 Dolor Sit Amet
   3.2 Consectetur Adipisicing Elit
   3.3 Sed Do Eiusmod
   3.4 Tempor Incididunt Ut
   3.5 Labore Et Dolore Magna Aliqua

FIG. 8

352 aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

2.1 Dolor Sit Amet. Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum. Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum. Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum. Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

2.2 Consectetur Adipisicing Elit. Lorem ipsum dolor sit amet, consectetur adipisicing elit, sed do eiusmod tempor incididunt ut labore et dolore magna aliqua. Ut enim ad minim veniam, quis nostrud exercitation ullamco

FIG. 9

SYSTEM AND METHOD FOR PROCESSING DOCUMENT

CROSS-REFERENCE TO RELATED APPLICATIONS

The application claims the benefit of U.S. provisional patent application Ser. No. 61/506,408 filed on 11 Jul. 2011, and also claims the benefit of U.S. provisional patent application Ser. No. 61/534,515 filed on 14 Sep. 2011 the entire disclosure of both of which applications are incorporated herein by reference.

TECHNICAL FIELD

This disclosure relates to document tools and, more particularly, to tools for processing and interacting with a document.

BACKGROUND

Many documents utilize a hierarchical organizational structure to improve comprehension and to allow for internal cross-referencing between the various sections of the document. While the hierarchical structure of a document may be useful for improving comprehension of the subject matter of the document, the management of the hierarchical structure during creation and editing of the document can present many challenges. For example, during editing of the document elements may be added at various levels of the hierarchical structure, new levels of hierarchy may be created and/or levels of the hierarchy may be removed, and elements may be moved within and/or between hierarchical levels. Such changes may impact portions of the document other than those being directly edited. The impacted portions of the document may be required to be updated in response to the edits, which may complicate the creation and editing process for the document.

SUMMARY OF DISCLOSURE

According to an embodiment, a method may include identifying a plurality of indicators of hierarchy within a document. The method may also include determining a hierarchical level associated with each of the plurality of indicators. The method may also include associating one or more portions of the document with a respective hierarchical level associated with each of the plurality of indicators.

One or more of the following features may be included. Each of the plurality of indicators may include an itemizer having one or more of a prefix, a stem, and a suffix. Determining the hierarchical level associated with each indicator may include interpreting at least a portion of each of the plurality of indicators to determine a numbering style associated with each indicator and a numerical value associated with each indicator.

Determining a hierarchical level associated with each of the plurality of indicators may include determining if a current indicator follows a preceding indicator. The method may also include determining if the current indicator follows an ancestor indicator in response to determining that the current indicator does not follow the preceding indicator. The method may also include determining an alternative interpretation of the preceding indicator. The method may also include setting the preceding indicator to the alternative interpretation, and setting the current indicator to follow the preceding indicator.

According to another embodiment, a computer program product may reside on a non-transitory computer readable medium having a plurality of instructions stored on it. When executed by a processor the instructions may cause the processor to perform operations including identifying a plurality of indicators of hierarchy within a document. Instructions may also be included for determining a hierarchical level associated with each of the plurality of indicators. Instructions may further be included for associating one or more portions of the document with a respective hierarchical level associated with each of the plurality of indicators.

One or more of the following features may be included. Each of the plurality of indicators may include an itemizer having one or more of a prefix, a stem, and a suffix. The instructions for determining the hierarchical level associated with each indicator may include instructions for interpreting at least a portion of each of the plurality of indicators to determine a numbering style associated with each indicator and a numerical value associated with each indicator.

The instructions for determining a hierarchical level associated with each of the plurality of indicators may include instructions for determining if a current indicator follows a preceding indicator. Instructions may also be included for determining if the current indicator follows an ancestor indicator in response to determining that the current indicator does not follow the preceding indicator. Instructions may also be included for determining an alternative interpretation of the preceding indicator. Instructions may also be included for setting the preceding indicator to the alternative interpretation, and setting the current indicator to follow the preceding indicator.

According to another embodiment, a computing system may include one or more processors configured to identify a plurality of indicators of hierarchy within a document. The one or more processors may also be configured to determine a hierarchical level associated with each of the plurality of indicators. The one or more processors may further be configured to associate one or more portions of the document with a respective hierarchical level associated with each of the plurality of indicators.

One or more of the following features may also be included. Each of the plurality of indicators may include an itemizer having one or more of a prefix, a stem, and a suffix. The one or more processors configured to determine the hierarchical level associated with each indicator may be further configured to interpret at least a portion of each of the plurality of indicators to determine a numbering style associated with each indicator and a numerical value associated with each indicator.

The one or more processors configured to determine a hierarchical level associated with each of the plurality of indicators may be further configured to determine if a current indicator follows a preceding indicator. The one or more processors may be further configured to determine if the current indicator follows an ancestor indicator in response to determining that the current indicator does not follow the preceding indicator. The one or more processors may be further configured to determine an alternative interpretation of the preceding indicator. The one or more processors may be further configured to set the preceding indicator to the alternative interpretation, and to set the current indicator to follow the preceding indicator.

According to an embodiment, a computer-implemented method may include processing a document to associate a plurality of items within the document with a group. The method may also include modifying, on the processor, a first item included within the group. The method may further include modifying, on the processor, all other items in the group based on the modified first item.

One or more of the following features may be included. The group may include a hierarchical group. Processing the document may include processing the document to associate each of the plurality of items with one of a plurality of hierarchical groups. The document may include a legal agreement. The group may include defined terms within the legal agreement.

The method may also include receiving a request to modify the first item included within the group. Modifying the first item included within the group may be based on, at least in part, the received request. Modifying the first item may include changing a formatting characteristic associated with the first item.

According to another embodiment, a computer program product may include a non-transitory computer readable medium having a plurality of instructions stored on it. When executed by a processor, the instructions may cause the processor to perform operations including processing a document to associate a plurality of items within the document with a group. Instructions may also be included for modifying a first item included with in the group. Instructions may further be included for modifying all other items in the group based on the modified first item.

One or more of the following features may be included. The group may include a hierarchical group. The instructions for processing the document may include instructions for processing the document to associate each of the plurality of items with one of a plurality of hierarchical groups. The document may include a legal agreement. The group may include defined terms within the legal agreement.

Instructions may be included for receiving a request to modify the first item included within the group. Modifying the first item included within the group may be based on, at least in part, the received request. The instructions for modifying the first item may include instructions for changing a formatting characteristic associated with the first item.

According to another embodiment, a computing system may include at least one processor that may be configured to process a document to associate a plurality of items within the document with a group. The one or more processors may also be configured to modify a first item included with in the group. The one or more processors may also be configured to modify all other items in the group based on the modified first item.

One or more of the following features may be included. The group may include a hierarchical group. The one or more processors configured to process the document may be configured to process the document to associate each of the plurality of items with one of a plurality of hierarchical groups. The document may include a legal agreement. The group may include defined terms within the legal agreement.

The one or more processors may be further configured to receive a request to modify the first item included within the group. The one or more processors may be configured to modify the first item included within the group is based on, at least in part, the received request. The one or more processors may be configured to modify the first item are configured to change a formatting characteristic associated with the first item.

According to another embodiment, a computer-implemented method may include determining a hierarchical structure associated with a document. The method may also include associating the hierarchical structure with a plurality of elements of the document. The method may further include generating a map of the document. The map may include a plurality of links to one or more of the elements of the document.

One or more of the following features may be included. The document may include a legal agreement. The plurality of elements of the document may include one or more provisions of the legal agreement. Determining the hierarchical structure associated with the document may include processing the document to determine the hierarchical structure. Determining the hierarchical structure associated with the document may include accessing structure data associated with the document. The plurality of links may include hyperlinks configured to navigate the document. The method may further include generating a visual representation of the map. The visual representation may include an arrangement of the plurality of links based on, at least in part, the hierarchical structure of the document.

According to another embodiment, a computer program product resides on a non-transitory computer readable medium having a plurality of instructions stored on it. When executed by a processor, the instructions may cause the processor to perform operations including determining a hierarchical structure associated with a document. Instructions may also be included for associating the hierarchical structure with a plurality of elements of the document. Instructions may further be included for generating a map of the document. The map may include a plurality of links to one or more of the elements of the document.

One or more of the following features may be included. The document may include a legal agreement. The plurality of elements of the document may include one or more provisions of the legal agreement. The instructions for determining the hierarchical structure associated with the document may include instructions for processing the document to determine the hierarchical structure. The instructions for determining the hierarchical structure associated with the document may include instructions for accessing structure data associated with the document. The plurality of links may include hyperlinks configured to navigate the document. Instructions may further be included for generating a visual representation of the map. The visual representation may include an arrangement of the plurality of links based on, at least in part, the hierarchical structure of the document.

According to another embodiment, a computing system includes one or more processors. The one or more processors may be configured to determine a hierarchical structure associated with a document. The one or more processor may also be configured to associate the hierarchical structure with a plurality of elements of the document. The one or more processors may further be configured to generate a map of the document. The map may include a plurality of links to one or more of the elements of the document.

One or more of the following features may be included. The document may include a legal agreement. The plurality of elements of the document may include one or more provisions of the legal agreement. The one or more processors configured to determine the hierarchical structure associated with the document may be configured to process the document to determine the hierarchical structure. The one or more processors configured to determine the hierarchical structure associated with the document may be configured to access structure data associated with the document. The plurality of links may include hyperlinks configured to navigate the document. The one or more processors may be further configured to generate a visual representation of the map. The visual representation may include an arrangement of the plurality of links based on, at least in part, the hierarchical structure of the document.

The details of one or more implementations are set forth in the accompanying drawings and the description below. Other features and advantages will become apparent from the description, the drawings, and the claims.

BRIEF DESCRIPTION OF THE DRAWINGS

FIG. 8 is a diagrammatic view of a user interface including a linkable map of a document that may be generated by the document process of FIG. 1 according to an embodiment;

FIG. 9 is a diagrammatic view of a user interface including a portion of a document that may be navigated by the document process of FIG. 1 according to an embodiment.

Like reference symbols in the various drawings indicate like elements.

DETAILED DESCRIPTION OF THE EXAMPLE EMBODIMENTS

Figure 1:
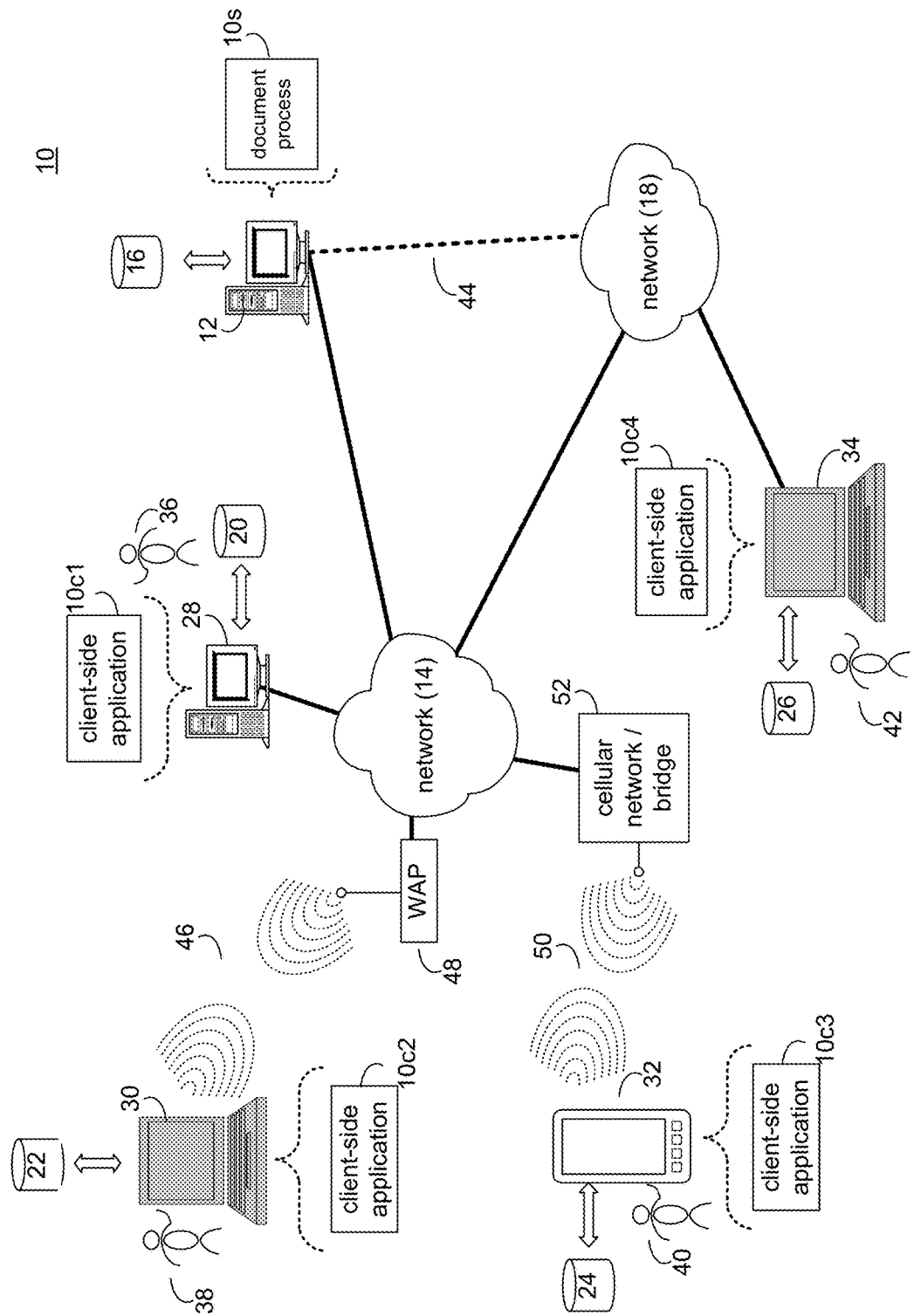
FIG. 1 is a diagrammatic view of a distributed computing network including a computing device that executes a document process according to an embodiment of the present disclosure.

Referring to FIG. 1, there is shown document process 10. For the following discussion, it is intended to be understood that document process 10 may be implemented in a variety of ways. For example, document process 10 may be implemented as a server-side process, a client-side process, or a server-side/client-side process.

For example, document process 10 may be implemented as a purely server-side process via document process 10s. Alternatively, document process 10 may be implemented as a purely client-side process via one or more of client-side application 10c1, client-side application 10c2, client-side application 10c3, and client-side application 10c4. Alternatively still, document process 10 may be implemented as a server-side/client-side process via event monitoring process 10s in combination with one or more of client-side application 10c1, client-side application 10c2, client-side application 10c3, and client-side application 10c4.

Accordingly, document process 10 as used in this disclosure may include any combination of document process 10s, client-side application 10c1, client-side application 10c2, client-side application 10c3, and client-side application 10c4.

According to various implementations and embodiments, document process 10 may provide various functionality. For example, in some embodiments, document process 10 may generally process a document to determine a hierarchical structure associated with one or more portions of the document. In some embodiments, document process 10 may generally process a document to generate a linkable map of the document based on, at least in part, a hierarchical structure of the document. In an example embodiment, the linkable map of the document may be utilized to, e.g., navigate the document. In still further embodiments, document process 10 may allow for groups or classes of items within a document to be modified based on, at least in part, the modification of one item included within a group or class. Various additional and/or alternative embodiments and/or features may also be implemented. Further, various features and embodiments may be implemented alone and/or in combination with one another.

Document process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of document process 10s, which may be stored on storage device 16 coupled to computing device 12, may be executed by one or more processors (not shown) and one or more memory architectures (not shown) included within computing device 12. Examples of storage device 16 may include but are not limited to non-transitory computer readable mediums, such as a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., including an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access event process 10 directly through network 14 or through secondary network 18. Further, event process 10 may be accessed through secondary network 18 via link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. Additionally, personal computer 34 is shown directly coupled to network 18 via a hardwired network connection.

Figure 2:
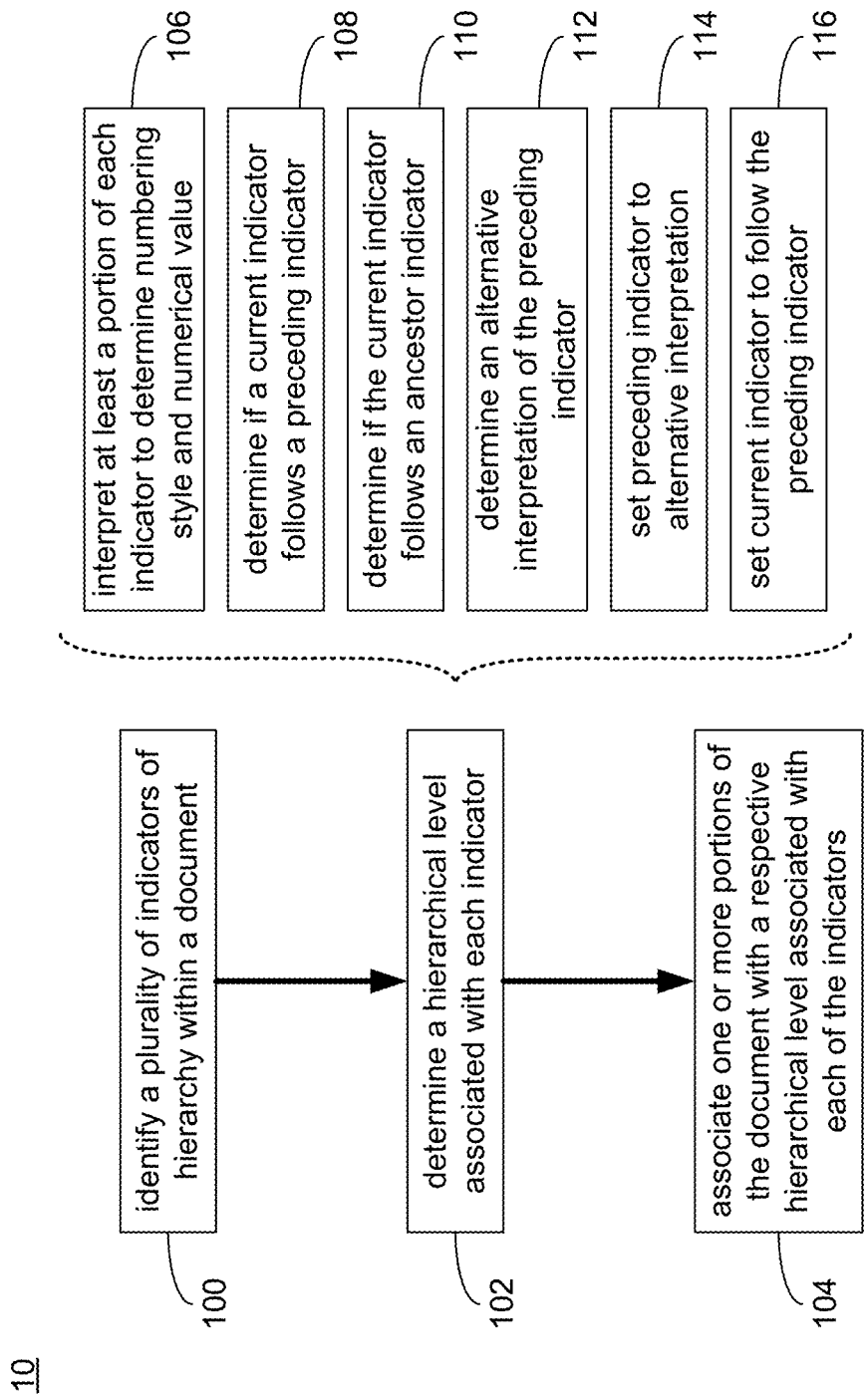
FIG. 2 is a flowchart of an embodiment of the document process of FIG. 1 according to an embodiment of the present disclosure.

Referring also to FIG. 2, according to an embodiment, document process 10 may identify 100 a plurality of indicators of hierarchy within a document. Document process 10 may also determine 102 a hierarchical level associated with each of the plurality of indicators. Further, document process 10 may associate 104 one or more portions of the document with a respective hierarchical level associated with each of the plurality of indicators.

For example, document process 10 may identify 100 a plurality of indicators of hierarchy within a document. The document may include a document that does not include meta-data or the like indicating a hierarchical structure of the document. Rather, the hierarchy of the document may be indicated by textual content and/or textual structure of the document. For example, the plurality of indicators of hierarchy within the document may include textual features, such as numbers, lettered captions, and the like; and/or textual structure of the document, such as formatting attributes, and the like. An example of a document that may include indicators of hierarchy may include legal agreements. The document may include any text document, such as a document created with a word processing application, a text editor application, or any other suitable application that may be utilized for the creation of a text document.

In an embodiment, each of the plurality of indicators may include an itemizer. In general, an itemizer may include a sequence of characters that may identify a hierarchical position or level (i.e., may identify position within a hierarchical structure). Each itemizer may include one or more of a prefix, a stem, and a suffix. A first example of an itemizer may include "Article I", wherein the prefix may include the characters "Article" (including the space character). The stem of the first example itemizer may include the character "I" and a suffix may not be included in the first example itemizer. A second example of an itemizer may include "Section 1.01.". The prefix of the second example itemizer may include "Section 1.0", (including the space character). The stem of the second example itemizer may include the character "1", and the suffix of the second example itemizer may include the character ".". A third example itemizer may include "c)", which may not include a prefix and which may include the character "c" as the stem and the character ")" as the suffix. A fourth example itemizer may include "(i)". In this fourth example itemizer the characters "(" and ")" may respectively be the prefix and suffix, and the character "i" may be the stem. It will be appreciated that various additional and/or alternative itemizers may also be utilized, wherein the itemizers may include a sequence of characters that may provide an indicator of hierarchical position or level.

Document process 10 may also determine 102 a hierarchical level associated with each of the plurality of indicators. For example, each of the plurality of indicators may represent and/or indicate a respective position within a hierarchical structure. Document process 10 may determine 102 the hierarchical level associated with each of the indicators, and thereby determine a respective position associated with each of the plurality of indicators within a hierarchical structure. In an example embodiment, determining 102 the hierarchical level associated with each indicator may include interpreting 106 at least a portion of each of the plurality of indicators to determine a numbering style associated with each indicator and a numerical value associated with each indicator. In some embodiments, document process 10 may interpret 106 at least the stem of an itemizer to determine a numbering style associated with the itemizer and to determine a numerical value associated with the itemizer.

Continuing with the foregoing, and referring to the previously described example itemizers (i.e., "Article I", "Section 1.01.", "c)", and "(i)"), document process 10 may interpret 106 the stem of the first example itemizer ("I") to determine a numbering style and a numerical value. In such an embodiment, document process 10 may interpret 106 the stem "I", as an upper case Roman numeral having a numerical value of one. Alternatively, document process 10 may interpret 106 the stem "I" as an upper case Latin letter having a numerical value of nine (e.g., based on "I" being the ninth letter of the Latin alphabet). Similarly, document process 10 may interpret 106 the stem "1" of the second example itemizer as an Arabic numeral having a numerical value of one. Further, document process 10 may interpret 106 the stem "c" of the third example itemizer as a lower case Latin letter having a numerical value of three. Alternatively, document process 10 may interpret 106 the stem "c" as a lower case Roman numeral having a numerical value of 100. As with the first example itemizer, document process 10 may interpret 106 the stem "i" of the fourth example itemizer in a similar manner as the first example itemizer (i.e., either as a lower case Roman numeral having a numerical value of one or as a lower case Latin letter having a numerical value of nine). In an embodiment in which an indicator of hierarchy (e.g., an itemizer) may include multiple possible interpretations, document process 10 may flag the indicator as having multiple possible interpretations and may determine an interpretation in a manner described in detail below. Additional and/or alternative numbering styles and associated numerical values may be utilized in connection with one or more of the plurality of indicators of hierarchy included within the document.

In addition to interpreting 106 a stem of an itemizer to determine a numbering style and/or a numerical value associated with the itemizer, in some embodiments document process 10 may also interpret one or more of the prefix and the suffix, e.g., to determine a relative hierarchical position of the itemizer based on, at least in part, the prefix and/or the suffix. Relative hierarchical position indicated by the prefix and/or suffix may be based on, for example, one or more rules and/or preferences that may be established, and/or based on, at least in part, an indication received from a user. For example, in an embodiment, a rule may be established wherein an agreement may be divided into a plurality of articles, and each of the articles may be divided into a plurality of sections. Sections may be further divided into, e.g., subsections, paragraphs, clauses, etc.). Various additional and/or alternative embodiments may be implemented.

In an example embodiment, determining 102 a hierarchical level associated with each of the plurality of indicators may include determining 108 if a current indicator follows a preceding indicator. In an embodiment, a preceding indicator may include an immediately preceding indicator (i.e., not including an intervening indicator in the document). A current indicator may follow a preceding indicator if, for example, document process interprets 106 the current indicator as having (1) the same prefix and suffix as the preceding indicator, (2) the same numbering style as the preceding indicator, and (3) a numerical value that is one greater than that of the preceding indicator. Consistent with the present disclosure, a prefix and suffix of a current indicator may be the same as the prefix and suffix of a preceding indicator if the prefix and suffix exactly match or approximately match based on, for example, a string edit distance (e.g., the Levenshtein distance).

Figure 3:
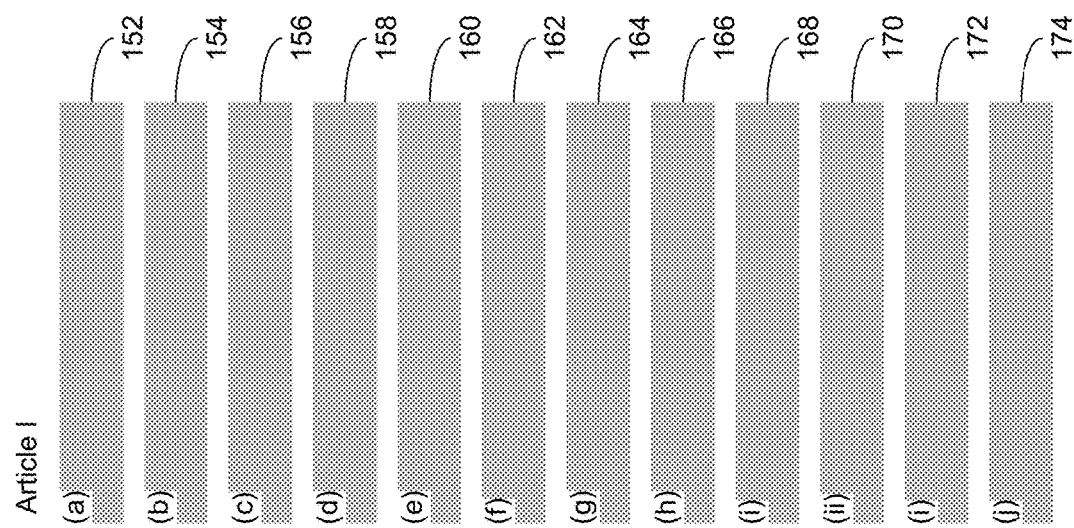
FIG. 3 is a diagrammatic representation of a portion of a document that may be processed by the document process of FIG. 1 according to an embodiment.

For example, and referring also to FIG. 3, a portion of an example embodiment of a document (e.g., agreement 150) is generally depicted. As shown, agreement 150 may generally include a plurality of provisions (e.g., provisions 152-174) of Article I. Each of example provisions 152-174 may include text of agreement 150 and may be identified by a textual indicator (e.g., respective indicators "(a)", "(b)", "(c)", "(d)", "(e)", "(f)", "(g)", "(h)", "(i)", "(ii)", "(i)", "(j)"), which may represent a hierarchical level of each provision within agreement 150. In an example embodiment, document process 10 may determine that the indicator "Article I" may define a hierarchical root, e.g., which may be a primary, or top, hierarchical level, e.g., based on one or more defined rules and/or preferences. Further, document process 10 may determine a hierarchical level associated with indicator "(a)" including interpreting 106 indicator "(a)" as including respective prefix and suffix "(" and ")" and stem "a". Further, document process 10 may interpret 106 the stem "a" as having a lower case Latin alphabetical numbering style and a numerical value of one. Further, document process 10 may determine 108 that current indicator "(a)" (i.e., document process 10 may be currently determining 102 the hierarchical level of indicator "(a)") may begin a new list within a hierarchical level.

In a generally similar manner, document process 10 may determine 102 the hierarchical level associated with indicator "(b)" associated with document provision 154. Determining 102 the hierarchical level associated with indicator "(b)" may include interpreting the stem "b" as having a lower case Latin alphabetical numbering style and a numerical value of two. Further, document process 10 may determine 108 that current indicator "(b)" (i.e., the indicator for which document process 10 may currently be determining a hierarchical level) may follow a preceding indicator. Consistent with the illustrated example, the preceding indicator may include indicator "(a)" (e.g., indicator "(a)" may be the immediately preceding identified 100 indicator). Consistent with the illustrative example, indicator "(b)" may include a prefix and a suffix which may match the prefix and suffix of indicator "(a)". Further, indicator "(b)" may have a lower case Latin alphabetical numbering style, which may be the same as indicator "(a)". Further, indicator "(b)" may have a numerical value of two, which may be one greater than the numerical value of indicator "(a)". Accordingly, document process 10 may determine that indicator "(b)" may follow indicator "(a)".

In a manner generally similar to the above-discussed embodiment, document process 10 may determine 108 that indicator "(c)", associated with provision 156, may follow indicator "(b)" associated with provision 154. Further, document process 10 may similarly determine that indicators "(d)", "(e)", "(f)", "(g)", "(h)", and "(i)", respectively associated with provisions 158-168, may follow one another in an ordered sequence residing in a common hierarchical level beneath root hierarchical level "Article I". Continuing with the illustrative embodiment depicted in FIG. 3, document process 10 may interpret 106 indicator "(ii)", associated with provision 170, as having a lower case Roman numeral numbering style and a numerical value of two. Further, document process 10 may determine that indicator "(ii)" does not follow the preceding indicator (i.e., indicator "(i)" associated with provision 168, being the immediately preceding indicator in agreement 150). For example, document process 10 may have interpreted 106 indicator "(i)" associated with provision 168 as having a lower case Latin alphabetical numbering style and a numerical value of nine, whereby indicator "(i)" associated with provision 168 may follow indicator "(h)", which may be interpreted 106 as having a lower case Latin alphabetical numbering style and a numerical value of eight. Accordingly, the numbering style of indicator "(ii)" (e.g., lower case Roman numeral numbering style) may not match the interpretation of the numbering style of indicator "(i)" associated with provision 168. Additionally, the numerical value of indicator "(ii)" (e.g., two) may not be one greater than the interpreted 106 numerical value of indicator "(i)" associated with provision 168 (e.g., which may have a numerical value of nine).

In response to determining that the current indicator (e.g., indicator "(ii)") does not follow the preceding indicator (e.g., indicator "(i)" associated with provision 168), document process 10 may determine 110 if the current indicator follows an ancestor indicator. An ancestor indicator may include any previously identified 100 indicator included under the rood hierarchical level (e.g., associated with the indicator "Article I" in the illustrated example). In some embodiments, an ancestor indicator may include an identified 100 previous indicator at a higher hierarchical level than the preceding indicator (e.g., at a hierarchical level closer to the root level than the preceding indicator). Consistent with the illustrated example, document process 10 may determine 110 that current indicator "(ii)" does not follow an ancestor indicator (e.g., no previous indicator includes a lower case Roman numeral numbering style, a numerical value one less than indicator "(ii)", and respective prefix and suffix "(" and ")").

In an embodiment, document process 10 may determine 112 an alternative interpretation of the preceding indicator. Still continuing with the illustrated example, the preceding indicator (e.g., indicator "(i)" associated with provision 168) may include more than one interpretation. For example, document process 10 may determine 112 that in addition to including a lower case Latin alphabetical numbering style and having a numerical value of nine, indicator "(i)" associated with provision 168 may include an interpretation as having a lower case Roman numeral numbering style and a numerical value of one.

In an embodiment, document process 10 may determine 112 the alternative interpretation of indicator "(i)" in response to determining that indicator "(ii)" does not follow the preceding indicator and does not follow any ancestor indicator. In some embodiments, document process 10 may determine 112 the alternative interpretation of indicator "(i)" when interpreting 106 indicator "(i)". In such an embodiment document process 10 may flag indicator "(i)" as including multiple interpretations (e.g., by associating metadata with indicator "(i)", or via another suitable mechanism).

In an embodiment, determining 112 the alternative interpretation of the preceding indicator (e.g., indicator "(i)" associated with provision 168) may include determining if the alternative interpretation of the preceding indicator may include an interpretation as being a first item within a sequence, and/or an interpretation that the current indicator (e.g., indicator "(ii)") may follow. According to an embodiment, document process 10 may set 114 the preceding indicator to the alternative interpretation, and may set 116 the current indicator to follow the preceding indicator. Continuing still with the illustrated example, indicator "(i)" associated with provision 168 may include the alternative interpretation of having a lower case Roman numeral numbering style and a numerical value of one. Document process 10 may set 114 the interpretation of indicator "(i)" to such an alternative interpretation. Further, document process 10 may set 116 the current indicator "(ii)", to follow indicator "(i)" associated with provision 168, as document process 10 may interpret 106 indicator "(ii)" as having a numbering style that matches that of indicator "(i)" associated with provision 168 (i.e., lower case Roman numerals), as having a numerical value one greater (e.g., two) than that of indicator "(i)" associated with provision 168, and as having a prefix and suffix that match those of indicator "(i)" associated with provision 168.

Continuing with the illustrated example, document process 10 may interpret 106 indicator "(i)" associated with provision 172, as having either a lower case Roman numeral numbering style and a numerical value of one, or as having a lower case Latin alphabetical numbering style and a numerical value of nine. Document process 10 may further determine that indicator "(i)" associated with provision 172 does not follow the preceding indicator (i.e., indicator "(ii)") based on either interpretation. Further, document process 10 may determine 110 that indicator "(i)" associated with provision 172 may follow an ancestor indicator. For example, document process 10 may determine 110 that an interpretation 106 of indicator "(i)" associated with provision 172 as having a lower case Latin alphabetical numbering style and a numerical value of nine (and respective prefix and suffix "(" and ")") may follow ancestor indicator "(h)", which may include an interpretation 106 as also having a lower case Latin alphabetical numbering style and a numerical value of eight (and respective prefix and suffix "(" and ")"). In an embodiment, determining 110 that indicator "(i)" associated with provision 172 follows an ancestor indicator may include determining 112 an alternative interpretation of indicator "(i)" associated with provision 172 (e.g., if an initial interpretation of indicator "(i)" was as having a lower case Roman numeral numbering style and a numerical value of one).

Document process 10 may associate 104 one or more portions of the document with a respective hierarchical level associated with each of the plurality of indicators. For example, as generally discussed above, indicator "(a)" may be associated with provision 152, indicator "(b)" may be associated with provision 154, indicator "(c)" may be associated with provision 156, indicator "(d)" may be associated with provision 158, indicator "(e)" may be associated with provision 160, indicator "(f)" may be associated with provision 162, indicator "(g)" may be associated with provision 164, indicator "(h)" may be associated with provision 166, indicator "(i)" may be associated with provision 168, indicator "(ii)" may be associated with provision 170, indicator "(i)" may be associated with provision 172, and indicator "(j)" may be associated with provision 174. In an embodiment, document process 10 may associate 104 the provision associated with each respective indicator with the hierarchical level associated with each indicator. Accordingly, each provision 152-174 may include a respective hierarchical level. In some embodiments, document process 10 may associate metadata including an indicator of hierarchical level with each provision. Other mechanisms for associating 104 one or more portions of the document with a respective hierarchical level associated with each of the plurality of indicators may similarly be utilized.

In an embodiment, a respective hierarchical level may be associated with each of the one or more portions of the document. In some embodiments, the hierarchical level may be included as an intrinsic property of each of the one or more portions of the document. In other embodiments, the hierarchical level may be associated with each of the one or more portions of the document, e.g., as metadata associated with each of the one or more portions of the document. The hierarchical level associated with each of the one or more portions of the document may include, for example, metadata indicating a relative hierarchical level of each of the portions of the document. In such an embodiment, the respective hierarchical level associated with each of the one or more portions of the document may be independent of any particular indicators of hierarchy or numbering style or system. Accordingly, in some embodiments, the relative hierarchical position of the one or more portions of the document may be dynamically adjusted in response to one or more portions of the document being added, deleted, and/or moved. As such, the determined hierarchical structure of the document may remain intact.

Figure 4:
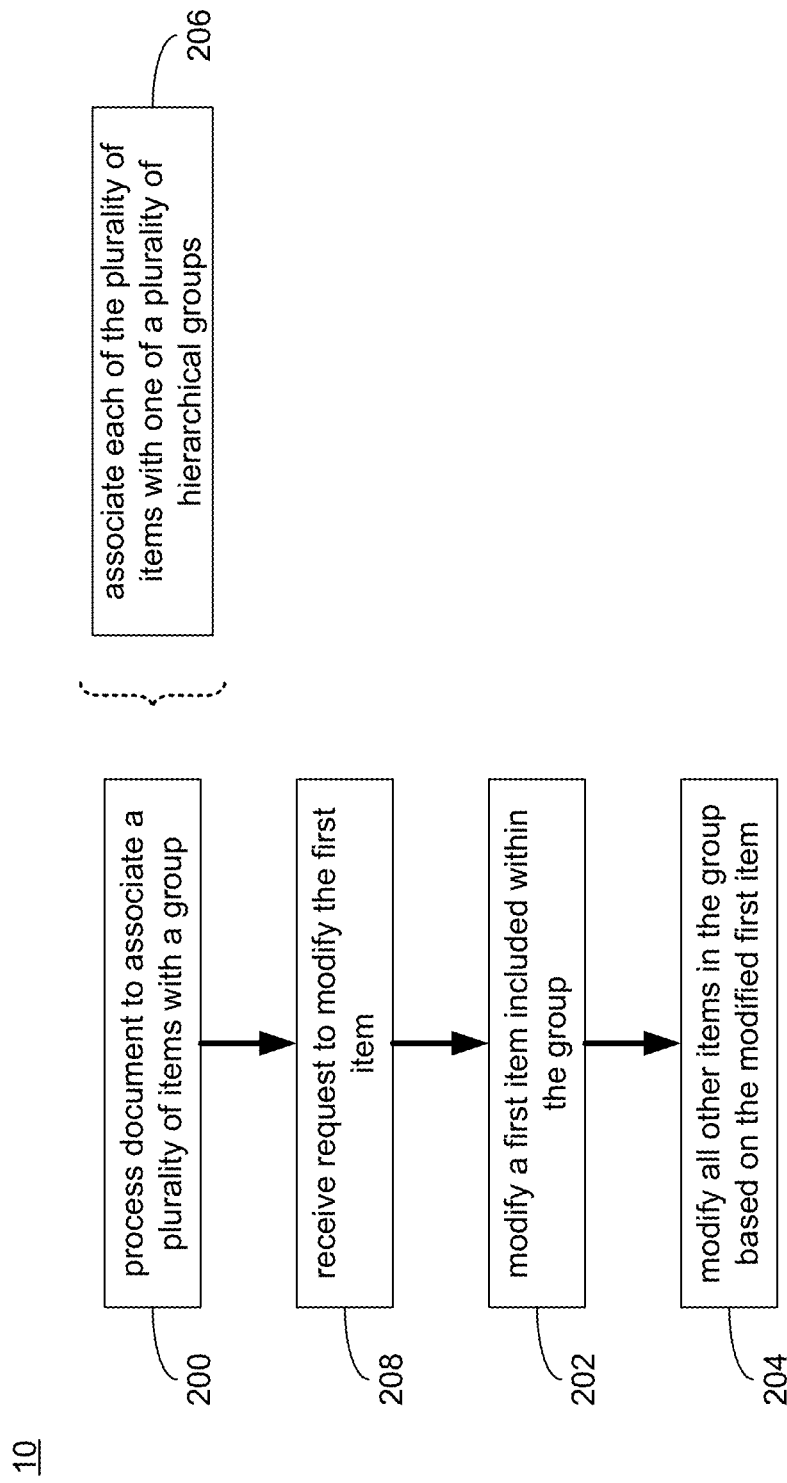
FIG. 4 is a flow chart of another embodiment of the document process of FIG. 1 according to an embodiment.

Referring also to FIG. 4, in another example embodiment, document process 10 may process 200 a document to associate a plurality of items within the document with a group. Document process 10 may also modify 202 a first item included within the group. Document process 10 may further modify 204 all other items in the group based on the modified first item.

According to an example embodiment, the document may include a legal agreement and/or another document type that may include a hierarchical structure. In such an embodiment in which the document may include a legal agreement and/or another document including a hierarchical structure, document process 10 may process 200 a document to associate a plurality of items within the document with a group in which the group may include a hierarchical group. Accordingly, processing 200 the document may include processing the document to associate 206 each of the plurality of items with one of a plurality of hierarchical groups. As such, document process 10 may generally process the document to group the plurality of items included within the document into one of a plurality of hierarchical groups.

Figure 5:
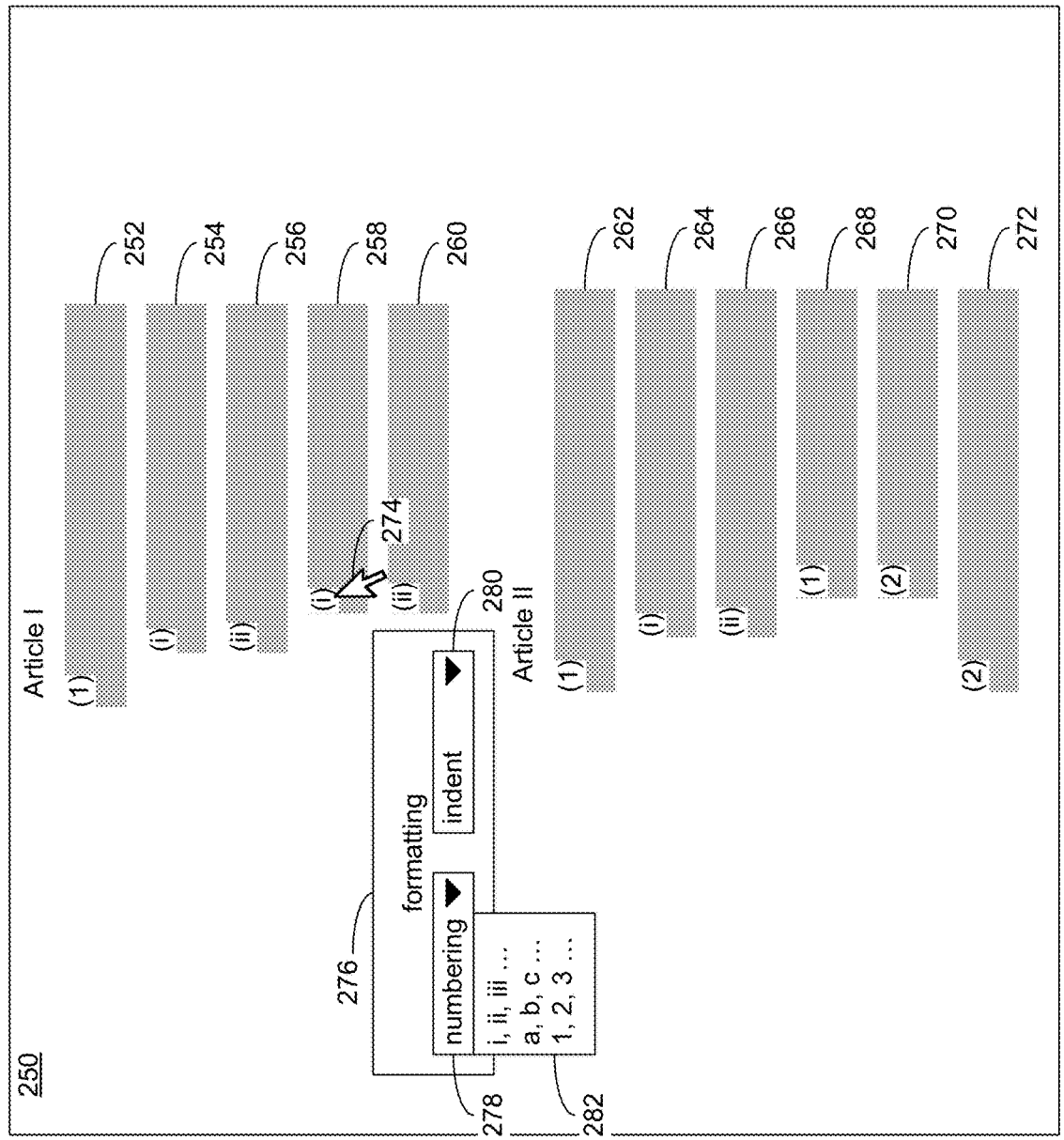
FIG. 5 is a diagrammatic representation of a user interface including a portion of a document that may be processed by the document process of FIG. 1 according to an embodiment.

For example, and referring also to FIG. 5, an example of a document is shown rendered in a user interface (e.g., user interface 250, that may be provided, at least in part, by document process 10). As shown, the document may generally include a plurality of provisions (e.g., provisions 252-272), which may be items within the document. Document process 10 may process 200 the document to associate 206 the various provisions of the document with one of a plurality of hierarchical groups. For example, document process 10 may process 200 the document to associate 206 provisions 252, 262, and 272 with a first level hierarchical group. In one embodiment, document process 10 may associate 206 provision 252 with a first level hierarchical group under a root hierarchical group Article I. Similarly, in an embodiment, document process 10 may associate 206 provisions 262 and 272 with a first level hierarchical group under a root hierarchical group Article II. Continuing with the above example, document process 10 may associate 206 provisions 254-256 and 264-266 with a second level hierarchical group (e.g., with provisions 254-256 being in a second level hierarchical group under provision 252, and with provisions 264-266 being in a second level hierarchical group under provision 262). Further, document process 10 may associate 206 provisions 268-270 with a third level hierarchical group (e.g., a third level hierarchical group under provision 266).

Processing 200 the document and/or associating 206 each of the plurality of items within the document with one of a plurality of hierarchical groups may include determining a hierarchical structure of the document, e.g., in a manner as generally described above (e.g., with reference to FIGS. 2 and 3). In an additional/alternative embodiment, the document may include structural information (e.g., in the form of metadata associated with the various provisions, etc.) that document process 10 may utilize for processing 200 the document.

In addition and/or as an alternative to associating the plurality of items with a hierarchical group, other groups may be utilized. For example, in an embodiment in which the document may include a legal agreement, the group may include defined terms within the legal agreement. The plurality of defined terms (e.g., a plurality of items within the document) may be identified and associated with the group including defined terms based on, for example, metadata associated with the defined terms (e.g., which may identify the items as being defined terms) and/or other common attributes of the items (e.g., formatting, such as the terms being in bold type, underlined, set in upper case letters, in title case, etc.). Document process 10 may associate the identified items with a group. Various items may be associated with various different groups.

Document process 10 may also modify 202 a first item included within the group. For example, formatting or other characteristics of the first item may be modified. In an example embodiment, document process 10 may receive 208 a request to modify the first item included within the group. For example, from within user interface 250, a user (e.g., user 36 operating personal computer 28) may select provision 258 (e.g., using onscreen pointer 274, which may be controlled by a pointing device, such as a mouse; not shown) by clicking (and/or otherwise selecting) provision 258. In the illustrated example, based upon, at least in part, the selection of provision 258, document process 10 may receive 208 a request to modify an item within a group that includes the third hierarchical level of the document.

In response to user 38 selecting provision 258, document process 10 (alone and/or in conjunction with another application) may provide pop-up window 276. In an illustrative example, pop-up window 276 may include formatting options, e.g., which may include options to modify a numbering style 278 and/or an indentation style 280 associated with provision 258. While pop-up window 276 is shown to include options for modifying formatting characteristics of provision 258, options may be included for modifying other characteristics of provision 258. Further, while pop-up window 276 is shown to include options for modifying numbering style and indentation of provision 258, options may be included for modifying other formatting characteristics (e.g., typeface, font size, capitalization, etc.). Accordingly, the illustrated embodiment should not be understood to limit the scope of the present disclosure.

In an illustrative embodiment, user 38 may choose, via onscreen pointer 274, the numbering style "a, b, c . . . " from dropdown menu 282. In response to user 38 choosing numbering style "a, b, c . . . " from dropdown menu 282, document process 10 may receive 208 a request to modify the first item (e.g., provision 258) included within the group (e.g., the group including the third hierarchical level of the document) by changing the number of provision 258 to lowercase alphabetical numbering format. Accordingly, modifying 202 the first item may be based on, at least in part, the received 208 request. It should be noted that the use of the term "first item" is intended to indicate any one of the items, without constraint on the order in which the item occurs in the group and/or the order in which the item was added to the group.

Figure 6:
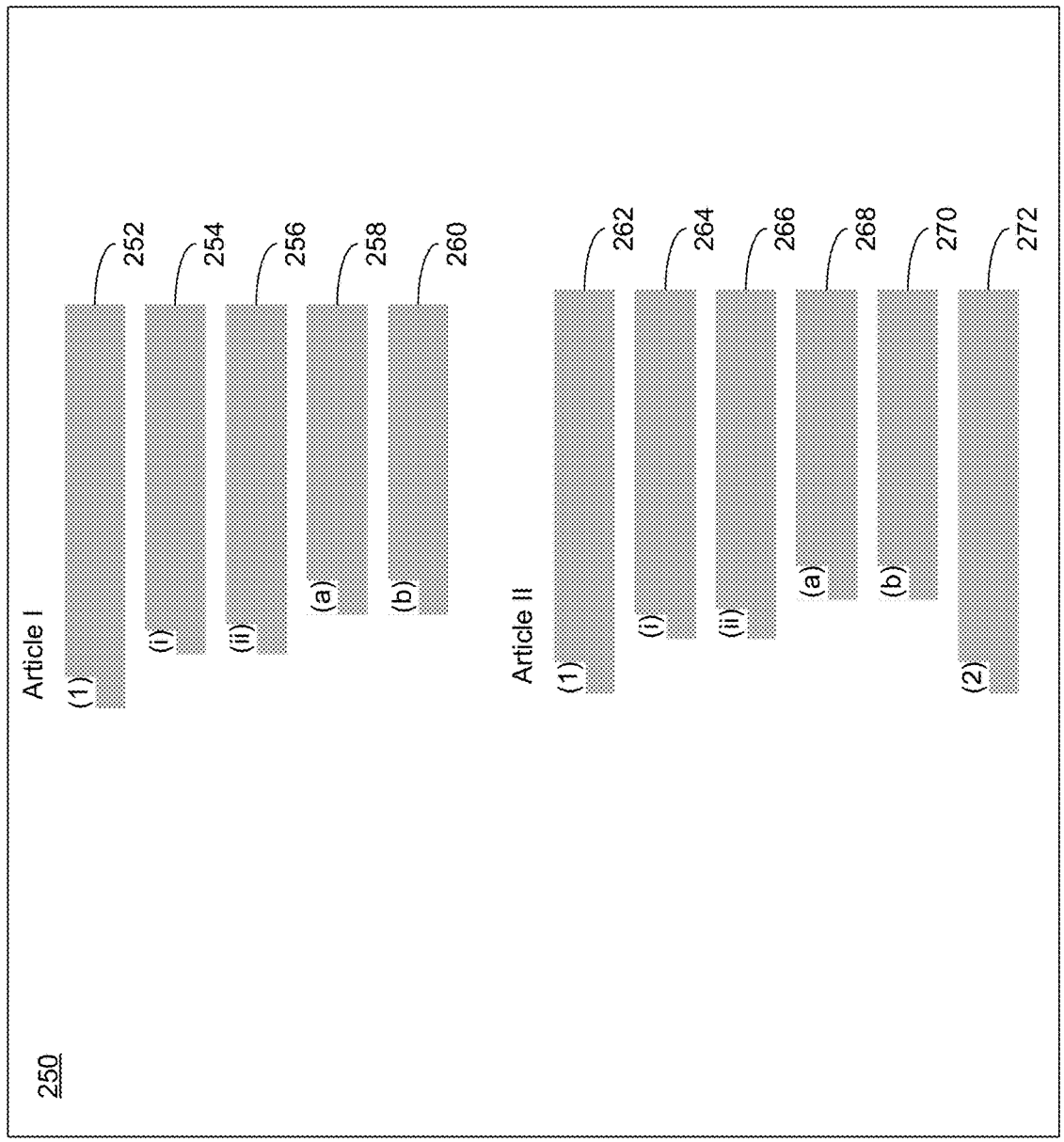
FIG. 6 is a diagrammatic representation of a the user interface of FIG. 5 including a reformatted portion of the document of FIG. 5 according to an embodiment.

Document process 10 may further modify 204 all other items in the group based on the modified first item. For example, and referring also to FIG. 6, document process 10 may modify 204 all of the other items with the group (e.g., provisions 260, 268, 270 included within the third level hierarchical group) to include a lower case alphabetical numbering style based on, at least in part, the modification of provision 258. As such, all items in a third level hierarchical group throughout the document may be modified 204 to have the same numbering style. Even in a situation, as shown in FIG. 5, in which different items in the group may initially have different numbering styles (e.g., provisions 258-260 may initially have included lower case Roman numbering, and provisions 268-270 may initially have included Arabic numbering), document process 10 may modify the numbering of all items included within the group based on the modification of the first item. Accordingly, in the example embodiment, modifying all of the other items included within the group may include changing formatting characteristics associated with all of the items within the group based on and/or to match the formatting characteristics of the first item. As discussed above, characteristics or attributes other than formatting characteristics may also be modified.

Figure 7:
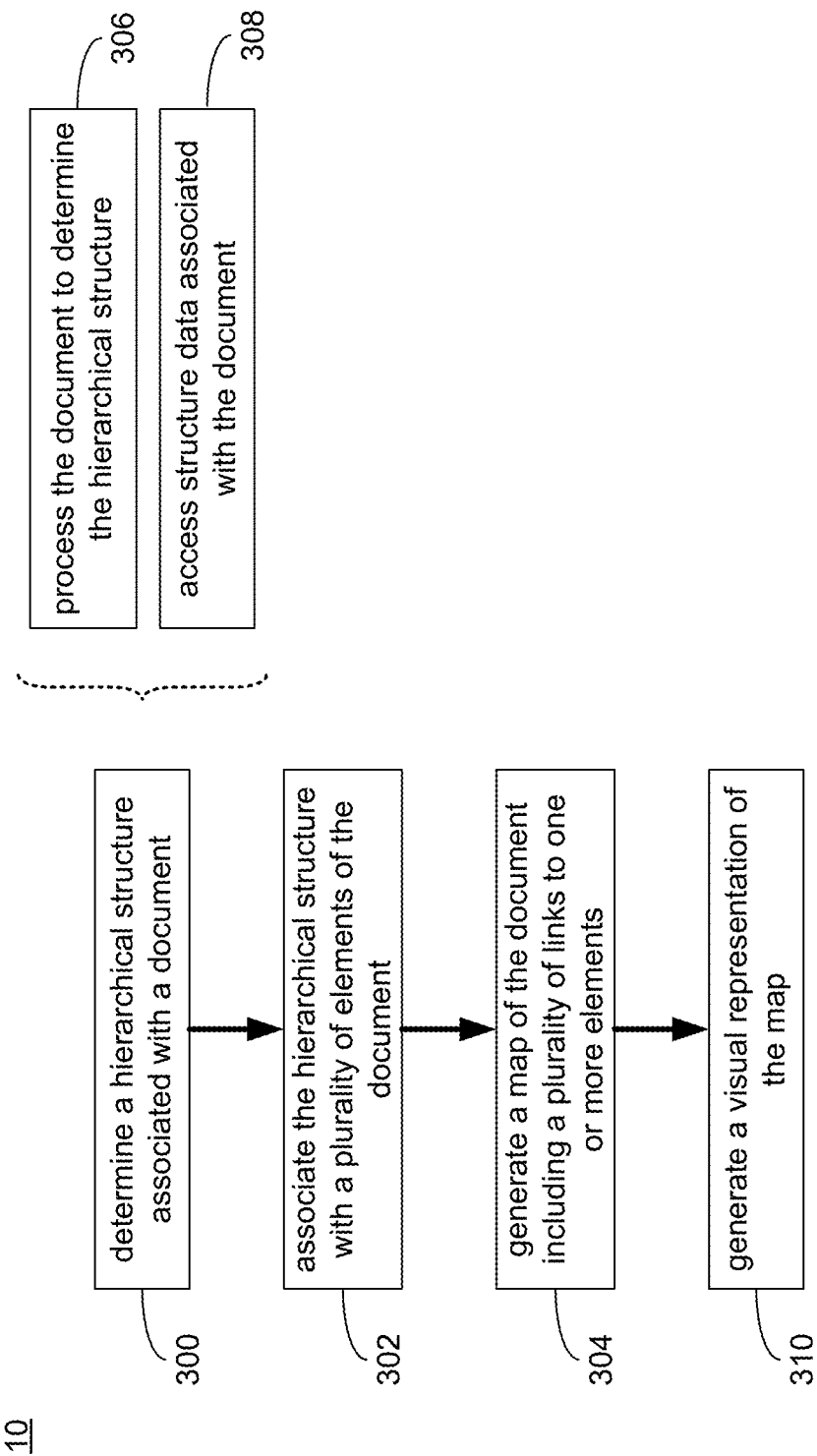
FIG. 7 is a flow chart of yet another embodiment of the document process of FIG. 1 according to an embodiment.

Referring to FIG. 7, according to an embodiment document process 10 may determine 300 a hierarchical structure associated with a document. Document process 10 may also associate 302 the hierarchical structure with a plurality of elements of the document. Document process 10 may further generate 304 a map of the document. The map may include a plurality of links to one or more of the elements of the document.

In an embodiment, the document may include any type of document including a hierarchical structure that may be indicated by textual content and/or textual structure of the document. An example of a document that may include a hierarchical structure may include a legal agreement. However, the present disclosure may similarly be applicable to other documents having a hierarchical structure. As discussed above, document process 10 may determine 300 a hierarchical structure associated with a document. In an embodiment, determining 300 the hierarchical structure associated with the document may include processing 306 the document to determine the hierarchical structure. A document including a hierarchical structure indicated by the textual content and/or textual structure of the document may be processed 306 to determine the hierarchical structure in a manner as generally described above with reference to FIGS. 2 and 3. For example, document process 10 may process 306 the document to identify one or more indicators of hierarchy within the document, and may determine a hierarchical level associated with each of the indicators.

In some embodiments, determining 300 the hierarchical structure associated with the document may include accessing 308 structure data associated with the document. For example, in an embodiment, a document may have previously been processed, e.g., in a manner as described above. In some embodiments, hierarchical structure data may be associated with the document, e.g., in the form of metadata, or otherwise associated with the document. Further, in some embodiments, the document may otherwise include structure data associated with the document. In such an embodiment, document process 10 may access 308 the structure data associated with the document to determine the hierarchical structure associated with the document.

Document process 10 may also associate 302 the hierarchical structure with a plurality of elements of the document. For example, document process 10 may associate each of the plurality of elements of the document with a specific hierarchical level. Further, in an embodiment in which the document may include a legal agreement, the plurality of elements of the document may include one or more provisions of the legal agreement. In such an embodiment, documents process 10 may associate a specific hierarchical level with each of the provisions of the legal agreement.

Document process 10 may further generate 304 a map of the document. The map may include a plurality of links to one or more of the elements of the document having an associated hierarchical level. Additionally, document process 10 may generate a visual representation of the map. As shown in FIG. 8, document process 10 (alone and/or in conjunction with one or more additional applications) may generate user interface 350. User interface 350 may include a visual representation of the map of the document, which may include an arrangement of the plurality of links based on, at least in part, the hierarchical structure of the document. For example, in the illustrated embodiment, the map shown in user interface 350 may include a map of a legal agreement including a plurality of provisions. In an embodiment, the visual representation of the map may include a link associated with each of the provisions (e.g., which may each be associated with a hierarchical level or position within the hierarchical structure of the document). The links associated with each of the provisions of the document may be arranged in the visual representation in a manner that may be based on the hierarchical structure of the document. For example, the arrangement of the links within the visual representation may provide a visual indicator of the relative hierarchical position of each of the elements of the document associated with the links. While the illustrated arrangement of the links within the visual representation included in user interface 350 utilizes indentations to indicate relative hierarchical level associated with the various links, it will be appreciated that such an arrangement is only intended for the purpose of illustration, as other implementations may be utilized.

The plurality of links may include hyperlinks configured to navigate the document. For example, and as shown in FIG. 8, each of the section numbers and associated titles may include a hyperlink. A user (e.g., user 38 accessing document process 10c1 via personal computer 28) may select a link within user interface 350 (e.g., link "2.1 Dolor Sit Amet") using onscreen pointer 274. Referring also to FIG. 9, in response to user 38 selecting the link "2.1 Dolor Sit Amet", document process 10 may navigate to a portion of the document associated with the hyperlink. For example, document process 10 may display user interface 352 which may include the portion of the document associated with the hyperlink (namely section 2.1 of the agreement).

Figure 10:
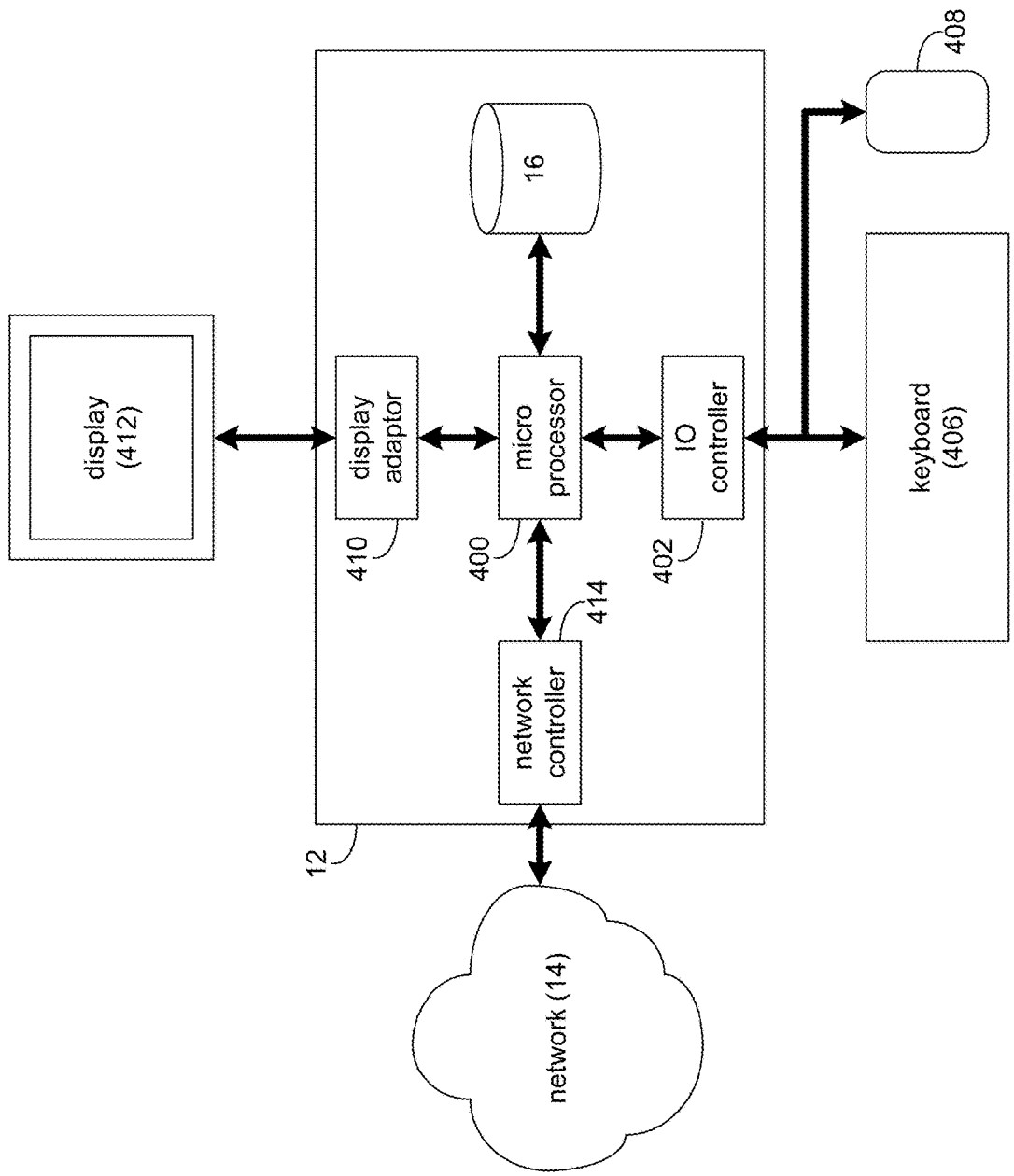
FIG. 10 is a diagrammatic view of the computing device of FIG. 1 according to an embodiment of the present disclosure.

Referring also to FIG. 10, there is shown a diagrammatic view of computing system 12. While computing system 12 is shown in this figure, this is for illustrative purposes only and is not intended to be a limitation of this disclosure, as other configurations are possible. For example, any computing device capable of executing, in whole or in part, event monitoring process 10 may be substituted for computing device 12 within FIG. 10, examples of which may include but are not limited to client electronic devices 28, 30, 32, 34.

Computing system 12 may include microprocessor 400 configured to e.g., process data and execute instructions/code for event monitoring process 10. Microprocessor 400 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 402 may be configured to couple microprocessor 400 with various devices, such as keyboard 406, mouse 408, USB ports (not shown), and printer ports (not shown). Display adaptor 410 may be configured to couple display 412 (e.g., a CRT or LCD monitor) with microprocessor 400, while network adapter 414 (e.g., an Ethernet adapter) may be configured to couple microprocessor 400 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 400) of a general purpose computer/special purpose computer/other programmable data processing apparatus (e.g., computing device 12), such that the instructions, which execute via the processor (e.g., processor 400) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   processing, on a processor, a document to associate a plurality of items within the document with a modifiable hierarchical group that is based upon, at least in part, a structure of the document, processing the document including:
   parsing text from at least a portion of a document, wherein the document does not include meta-data indicating a hierarchical structure within the document;
   identifying a plurality of hierarchical indicators from the text parsed from the at least a portion of the document, wherein each hierarchical indicator is associated with one or more of the plurality of items within the document and includes one or more portions, the one or more portions including a prefix, a stem, or a suffix;
   analyzing the one or more portions of each of the plurality of hierarchical indicators to determine an alphanumerical value associated with each of the plurality of hierarchical indicators;
   analyzing the one or more portions of each of the plurality of hierarchical indicators to determine an alphanumerical numbering style associated with each of the plurality of hierarchical indicators;

determining a hierarchical level for each of the plurality of hierarchical indicators based upon, at least in part, one or more of the alphanumerical value and the alphanumerical numbering style associated with each of the plurality of hierarchical indicators, wherein the hierarchical level indicates a respective position within the hierarchical structure of the document and is determined for a respective hierarchical indicator prior to determining the hierarchical level associated with a following hierarchical indicator;

determining a modifiable hierarchical group for each of the plurality of hierarchical indicators based upon, at least in part, the determined hierarchical level for each of the plurality of hierarchical indicators; and associating one or more of the plurality of items within the document with a modifiable hierarchical group based upon, at least in part, the plurality of hierarchical indicators, wherein associating the one or more of the plurality of items within the document with the modifiable hierarchical group includes associating meta-data with the one or more of the plurality of items within the document, wherein the meta-data indicates the modifiable hierarchical group;

modifying, on the processor, a first item included within the modifiable hierarchical group; and modifying, on the processor, all other items in the modifiable hierarchical group based on the modified first item.

2. The computer-implemented method of claim 1, wherein processing the document includes processing the document to associate each of the plurality of items with one of a plurality of modifiable hierarchical groups.

3. The computer-implemented method of claim 1, wherein the document includes a legal agreement.

4. The computer-implemented method of claim 3, wherein the modifiable hierarchical group includes defined terms within the legal agreement.

5. The computer-implemented method of claim 1, further comprising:

receiving a request to modify the first item included within the modifiable hierarchical group; and wherein modifying the first item included within the modifiable hierarchical group is based on, at least in part, the received request.

6. The computer-implemented method of claim 1, wherein modifying the first item includes changing a formatting characteristic associated with the first item.

7. A computer program product comprising a non-transitory computer readable medium having a plurality of instructions stored thereon, which, when executed by a processor, cause the processor to perform operations comprising:

processing a document to associate a plurality of items within the document with a modifiable hierarchical group that is based upon, at least in part, a structure of the document, processing the document including:

parsing text from at least a portion of a document, wherein the document does not include meta-data indicating a hierarchical structure within the document;

identifying a plurality of hierarchical indicators from the text parsed from the at least a portion of the document, wherein each hierarchical indicator is associated with one or more of the plurality of items within the document and includes one or more portions, the one or more portions including a prefix, a stem, or a suffix;

analyzing the one or more portions of each of the plurality of hierarchical indicators to determine an alphanumerical value associated with each of the plurality of hierarchical indicators;

analyzing the one or more portions of each of the plurality of hierarchical indicators to determine an alphanumerical numbering style associated with each of the plurality of hierarchical indicators;

determining a hierarchical level for each of the plurality of hierarchical indicators based upon, at least in part, one or more of the alphanumerical value and the alphanumerical numbering style associated with each of the plurality of hierarchical indicators, wherein the hierarchical level indicates a respective position within the hierarchical structure of the document and is determined for a respective hierarchical indicator prior to determining the hierarchical level associated with a following hierarchical indicator;

determining a modifiable hierarchical group for each of the plurality of hierarchical indicators based upon, at least in part, the determined hierarchical level for each of the plurality of hierarchical indicators; and associating one or more of the plurality of items within the document with a modifiable hierarchical group based upon, at least in part, the plurality of hierarchical indicators, wherein associating the one or more of the plurality of items within the document with the modifiable hierarchical group includes associating meta-data with the one or more of the plurality of items within the document, wherein the meta-data indicates the modifiable hierarchical group;

modifying a first item included within the modifiable hierarchical group; and modifying all other items in the modifiable hierarchical group based on the modified first item.

8. The computer program product of claim 7, wherein the instructions for processing the document include instructions for processing the document to associate each of the plurality of items with one of a plurality of modifiable hierarchical groups.

9. The computer program product of claim 7, wherein the document includes a legal agreement.

10. The computer program product of claim 9, wherein the modifiable hierarchical group includes defined terms within the legal agreement.

11. The computer program product of claim 7, further comprising:

instructions for receiving a request to modify the first item included within the modifiable hierarchical group; and wherein modifying the first item included within the modifiable hierarchical group is based on, at least in part, the received request.

12. The computer program product of claim 7, wherein the instructions for modifying the first item include instructions for changing a formatting characteristic associated with the first item.

13. A computing system comprising at least one processor configured to:

process a document to associate a plurality of items within the document with a modifiable hierarchical group that is based upon, at least in part, a structure of the document, processing the document including:

parse text from at least a portion of a document, wherein the document does not include meta-data indicating a hierarchical structure within the document;

identify a plurality of hierarchical indicators from the text parsed from the at least a portion of the document, wherein each hierarchical indicator is associated with one or more of the plurality of items within the document and includes one or more portions, the one or more portions including a prefix, a stem, or a suffix;

analyze the one or more portions of each of the plurality of hierarchical indicators to determine an alphanumerical value associated with each of the plurality of hierarchical indicators;

analyze the one or more portions of each of the plurality of hierarchical indicators to determine an alphanumerical numbering style associated with each of the plurality of hierarchical indicators;

determine a hierarchical level for each of the plurality of hierarchical indicators based upon, at least in part, one or more of the alphanumerical value and the alphanumerical numbering style associated with each of the plurality of hierarchical indicators, wherein the hierarchical level indicates a respective position within the hierarchical structure of the document and is determined for a respective hierarchical indicator prior to determining the hierarchical level associated with a following hierarchical indicator;

determine a modifiable hierarchical group for each of the plurality of hierarchical indicators based upon, at least in part, the determined hierarchical level for each of the plurality of hierarchical indicators; and associate one or more of the plurality of items within the document with a modifiable hierarchical group based upon, at least in part, the plurality of hierarchical indicators, wherein associating the one or more of the plurality of items within the document with the modifiable hierarchical group includes associating meta-data with the one or more of the plurality of items within the document, wherein the meta-data indicates the modifiable hierarchical group;

modify a first item included within the modifiable hierarchical group; and modify all other items in the modifiable hierarchical group based on the modified first item.

14. The computing system of claim 13, wherein the one or more processors configured to process the document are configured to process the document to associate each of the plurality of items with one of a plurality of modifiable hierarchical groups.

15. The computing system of claim 13, wherein the document includes a legal agreement.

16. The computing system of claim 15, wherein the modifiable hierarchical group includes defined terms within the legal agreement.

17. The computing system of claim 13, wherein the one or more processors are further configured to:
receive a request to modify the first item included within the modifiable hierarchical group; and
wherein the one or more processors are configured to modify the first item included within the modifiable hierarchical group is based on, at least in part, the received request.

18. The computing system of claim 13, wherein the one or more processors configured to modify the first item are configured to change a formatting characteristic associated with the first item.

* * * * *